(12) United States Patent
Cohen et al.

(10) Patent No.: US 12,407,737 B1
(45) Date of Patent: Sep. 2, 2025

(54) TECHNIQUES FOR DYNAMIC COMPACT POLICY GENERATION FOR COMPUTING ENVIRONMENTS

(71) Applicant: Cyera, Ltd., Tel Aviv (IL)

(72) Inventors: Ron Cohen, Petah Tikva (IL); Alon Glazer, Rehovot (IL)

(73) Assignee: Cyera, Ltd., Tel Aviv (IL)

( * ) Notice: Subject to any disclaimer, the term of this patent is extended or adjusted under 35 U.S.C. 154(b) by 0 days.

(21) Appl. No.: 18/951,224

(22) Filed: Nov. 18, 2024

(51) Int. Cl.
*H04L 29/06* (2006.01)
*H04L 9/40* (2022.01)

(52) U.S. Cl.
CPC .................................. *H04L 63/20* (2013.01)

(58) Field of Classification Search
CPC ..... H04L 63/20; H04L 63/10; H04L 63/0218; H04L 63/1425; H04L 63/0263; H04L 63/101
See application file for complete search history.

(56) References Cited

U.S. PATENT DOCUMENTS

| | | | |
|---|---|---|---|
| 8,856,926 B2 | 10/2014 | Narayanaswamy et al. | |
| 9,258,329 B2 | 2/2016 | Narayanaswamy | |
| 11,533,312 B2 | 12/2022 | Kuppannan et al. | |
| 11,575,712 B2 | 2/2023 | Kung et al. | |
| 11,652,812 B2 | 5/2023 | Dykes et al. | |
| 11,757,918 B2* | 9/2023 | Clifford | H04L 63/1433 |
| 2014/0331280 A1 | 11/2014 | Porras et al. | |
| 2024/0160902 A1* | 5/2024 | Padgett | G06N 3/0895 |
| 2024/0291853 A1* | 8/2024 | Murphy | G06F 21/552 |
| 2024/0403697 A1* | 12/2024 | Nordfors | G06N 20/00 |

\* cited by examiner

*Primary Examiner* — Longbit Chai
(74) *Attorney, Agent, or Firm* — M&B IP Analysts, LLC

(57) ABSTRACT

A system and method for dynamically generating a compact cybersecurity policy based on an original policy is presented. The method includes receiving a cybersecurity policy in a first policy language, the first policy language including a first data format; determining a constraint of a second policy language; generating a context for a generative artificial intelligence (AI) based at least on the determined constraint; configuring the generative AI to generate a second cybersecurity policy in the second policy language based on the determined constraint and the generated context; and applying the generated second cybersecurity policy in a cybersecurity platform configured to utilize the second policy language.

15 Claims, 5 Drawing Sheets

TECHNIQUES FOR DYNAMIC COMPACT POLICY GENERATION FOR COMPUTING ENVIRONMENTS

TECHNICAL FIELD

The present disclosure relates generally to digital security programs, and specifically to applying multi-source policies on a computing environment using a unified policy.

BACKGROUND

A Data Loss Prevention (DLP) platform is a security tool designed to prevent sensitive information from being accessed, shared, or leaked outside an organization. It monitors, detects, and blocks unauthorized attempts to transfer or misuse confidential data, whether accidentally or intentionally. DLP platforms are typically deployed across networks, endpoints, and cloud services, ensuring that personal data, intellectual property, and financial information remain protected.

One common challenge with DLP is balancing security with employee productivity. For example, overly restrictive policies can block legitimate business activities, leading to frustration among staff and inefficiencies in workflows. A common problem is false positives, where the platform mistakenly flags harmless actions as threats, overwhelming IT teams and reducing trust in the system. Additionally, managing DLP in increasingly complex environments, with the rise of remote work and cloud adoption, creates further difficulties in tracking and securing data as it moves beyond traditional perimeters. This complexity increases the risk of blind spots in protection, making it harder to ensure comprehensive coverage.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include receiving a cybersecurity policy in a first policy language, the first policy language including a first data format The method may also include determining a constraint of a second policy language The method may furthermore include generating a context for a generative artificial intelligence (AI) based at least on the determined constraint; configuring the generative AI to generate a second cybersecurity policy in the second policy language based on the determined constraint and the generated context; and applying the generated second cybersecurity policy in a cybersecurity platform configured to utilize the second policy language. Other embodiments of this aspect include corresponding computer systems, apparatus, and computer programs recorded on one or more computer storage devices, each configured to perform the actions of the methods.

Implementations may include one or more of the following features The method may include: detecting a length constraint of the second policy language, where the length constraint is a constraint on the length of a policy stored as a string of characters The method may include: detecting in the cybersecurity policy a first constraint, where the second policy language does not support the first constraint; and determining the constraint of the second policy language based on the first constraint The method may include: configuring the generative AI to detect a policy intent in the first policy language; and configuring the generative AI to further generate the second cybersecurity policy based on the detected policy intent. The method may include: generating a prompt for a language model, where the generative AI includes the language model; and generating the second cybersecurity policy based on a result of processing the generated prompt by the generative AI utilizing at least the language model The method may include: generating the prompt based on: the generated context, the determined constraint, and the received cybersecurity policy. The method may include: generating the prompt based on a first prompt template selected from a plurality of prompt templates, where each prompt template corresponds to an unique second policy language of a plurality of second policy languages. Implementations of the described techniques may include hardware, a method or process, or a computer tangible medium.

In one general aspect, non-transitory computer-readable medium may include one or more instructions that, when executed by one or more processors of a device, cause the device to: receive a cybersecurity policy in a first policy language, the first policy language including a first data format; determine a constraint of a second policy language; generate a context for a generative artificial intelligence (AI) based at least on the determined constraint configure the generative AI to generate a second cybersecurity policy in the second policy language based on the determined constraint and the generated context; and apply the generated second cybersecurity policy in a cybersecurity platform configured to utilize the second policy language. Other embodiments of this aspect include corresponding computer systems, apparatus, and computer programs recorded on one or more computer storage devices, each configured to perform the actions of the methods.

In one general aspect, system may include one or more processors configured to: The system may also receive a cybersecurity policy in a first policy language, the first policy language including a first data format. The system may furthermore determine a constraint of a second policy language. The system may in addition generate a context for a generative artificial intelligence (AI) based at least on the determined constraint. The system may moreover configure the generative AI to generate a second cybersecurity policy in the second policy language based on the determined constraint and the generated context. The system may also apply the generated second cybersecurity policy in a cybersecurity platform configured to utilize the second policy language. Other embodiments of this aspect include corresponding computer systems, apparatus, and computer programs recorded on one or more computer storage devices, each configured to perform the actions of the methods.

Implementations may include one or more of the following features. The system where the one or more processors are further configured to: detect a length constraint of the second policy language, where the length constraint is a constraint on the length of a policy stored as a string of characters. The system where the one or more processors are further configured to: detect in the cybersecurity policy a first constraint, where the second policy language does not support the first constraint; and determine the constraint of the second policy language based on the first constraint. The system where the one or more processors are further configured to: configure the generative AI to detect a policy intent in the first policy language; and configure the generative AI to further generate the second cybersecurity policy based on the detected policy intent. The system where the one or more processors are further configured to: generate a prompt for a language model, where the generative AI includes the language model; and generate the second cybersecurity policy based on a result of processing the generated prompt by the generative AI utilizing at least the language model. The system where the one or more processors are further configured to: generate the prompt based on: the generated context, the determined constraint, and the received cybersecurity policy. The system where the one or more processors are further configured to: generate the prompt based on a first prompt template selected from a plurality of prompt templates, where each prompt template corresponds to an unique second policy language of a plurality of second policy languages. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
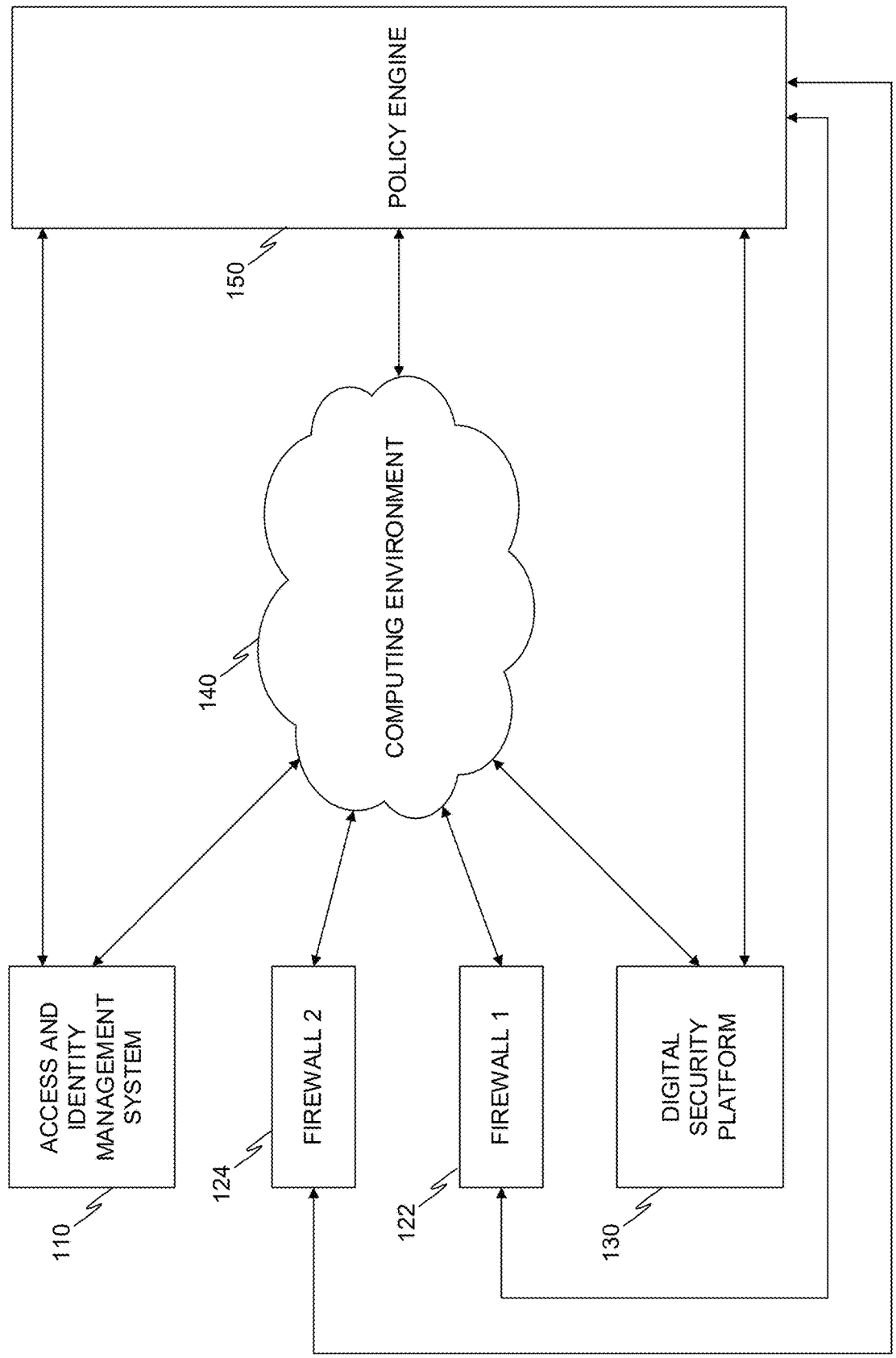
FIG. 1 is an example schematic diagram of a computing environment with a plurality of digital security platforms, utilized to describe an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 is an example schematic diagram of a computing environment with a plurality of digital security platforms, utilized to describe an embodiment. In an embodiment, a computing environment 140 includes a cloud computing environment, a hybrid computing environment, an on-prem computing environment, various combinations thereof, and the like.

According to an embodiment, a cloud computing environment includes a virtual private cloud (VPC), a virtual network (VNet), a virtual private network (VPN), various combinations thereof, and the like. In an embodiment, a cloud computing environment is deployed on a cloud computing infrastructure, such as Amazon® Web Services (AWS), Microsoft Azure®, Google® Cloud Platform (GCP), and the like. In some embodiments, the computing environment 140 includes a plurality of different cloud computing environments, each deployed on a different cloud computing infrastructure.

In an embodiment, the computing environment 140 includes resources, identities, and the like. In some embodiments, resources in the computing environment 140 communicate over a network infrastructure of the computing environment 140. In some embodiments, various platforms, systems, and the like, are deployed on the computing environment 140, in the computing environment 140, etc., which include policies.

In some embodiments, a policy is a rule, a conditional rule, and the like, which are applied to determine a state, for example of an entity of the computing environment 140. In certain embodiments, a policy pertains to a resource, to a user account, to a network traffic type, combinations thereof, and the like.

For example, according to an embodiment, an identity and access management (IAM) system 110 is configured to apply policies for accessing resources in the computing environment 140, performing authentication respective of user accounts, etc. In an embodiment, an IAM system 110 is, for example, Okta®. In some embodiments, the IAM system 110 includes a plurality of policies. In an embodiment, policies of the IAM system 110 are stored in a first policy language.

In certain embodiments, a policy language is a computing language in which policy rules, conditions, and the like, are stored. In some embodiments, the policy language includes a declaratory language, a regular expression (regex), Boolean notation, a combination thereof, and the like.

In an embodiment, the computing environment 140 further includes, or is otherwise operable with, a first firewall 122. In certain embodiments, the computing environment 140 further includes, or is otherwise operable with, a second firewall 124. In some embodiments, a firewall 122 is configured to filter network traffic between resources of the computing environment 140, between resources of the computing environment 140 and an external network (not shown), between the computing environment 140 and a public network, such as the Internet, and the like.

In some embodiments, the firewall 122 includes a web application firewall (WAF), application firewall, stateful firewall, packet filter, a combination thereof, and the like. In an embodiment, the firewall 122 includes a deep packet inspection (DPI) module. In certain embodiments, the firewall 122 includes routing tables, rules, policies, and the like, which are utilized to filter network traffic.

In certain embodiments, the firewall 122 includes rules, policies, and the like, which are stored utilizing a second policy language, which is different from a policy language utilized, for example, by the IAM system 110.

According to an embodiment, a second firewall 124 is configured to apply policies in a second policy language, which is different than a first policy language, which the first firewall 122 is configured to apply.

In some embodiments, the second policy language includes a constraint which is not included in the first policy language. For example, in an embodiment, the second policy language includes a length constraint (i.e., a policy is limited by a number of characters which are stored for each policy). In certain embodiments, it is advantageous to adapt a policy from a first policy language to a second policy language.

For example, according to an embodiment, a policy engine 150 is configured to receive, import, access, and the like, a policy from the first firewall 122. In some embodiments, the policy engine 150 is configured to generate a second policy for the second firewall 124 based on the received policy from the first firewall 122. In certain embodiments, the policy engine 150 is configured to generate the second policy based on a normalized policy, the normalized policy generated based on the received policy. In an embodiment, the policy engine 150, the first firewall 122, the second firewall 124, and the like, are, include, etc., a data loss prevention platform (DLP). For example, in an embodiment, a DLP is Proofpoint® DLP, Forcepoint® DLP, Cyberhaven™, and the like.

In an embodiment, the computing environment 140 utilizes, or is otherwise subject to, a plurality of digital security platforms (DSPs), such as DSP 130, each having a policy stored in a unique policy language.

In some embodiments, each policy language includes constraints which are unique to that policy language. For example, in an embodiment, a first policy language only includes regex rules up to one thousand characters in length. In certain embodiments, the digital security platform is, for example, a data loss prevention (DLP) software.

According to an embodiment, a policy engine 150 is configured to normalize policies received from a plurality of DSPs, such as DSP 130, firewall 122, and IAM server 110. In an embodiment, normalizing a policy includes receiving a policy from a DSP, such as DSP 130, and generating a normalized policy based on the received policy. In some embodiments, a normalized policy is generated based on a predefined data schema, which includes a plurality of data fields, at least a portion of which conform to data fields of the received policy.

In some embodiments, the policy engine 150 includes rules, conditional rules, and the like, which are utilized to generate the normalized policy based on a received policy. In an embodiment, the policy engine 150 includes a generative artificial intelligence (GenAI) which is configured to generate a normalized policy. In an embodiment, the GenAI is a language model, such as a large language model (LLM), small language model (SLM), and the like.

In an embodiment, an LLM is configured to generate a normalized policy based on a predetermined prompt, which, when processed by the LLM, configures the LLM to generate an output which includes a normalized policy. In some embodiment, the prompt is modified, for example based on the received policy.

In certain embodiments, the policy engine 150 is configured to generate a policy in a first policy language, based on a received policy which is stored in a second policy language. In an embodiment, the policy engine 150 is configured to receive a policy in a first policy language, generate a normalized policy based on the received policy, and generate a policy in a second policy language based on the normalized policy.

In some embodiments, the policy engine 150 is configured to send a policy generated in a second policy language to a DSP which is configured to apply policies in the second policy language.

Figure 2:
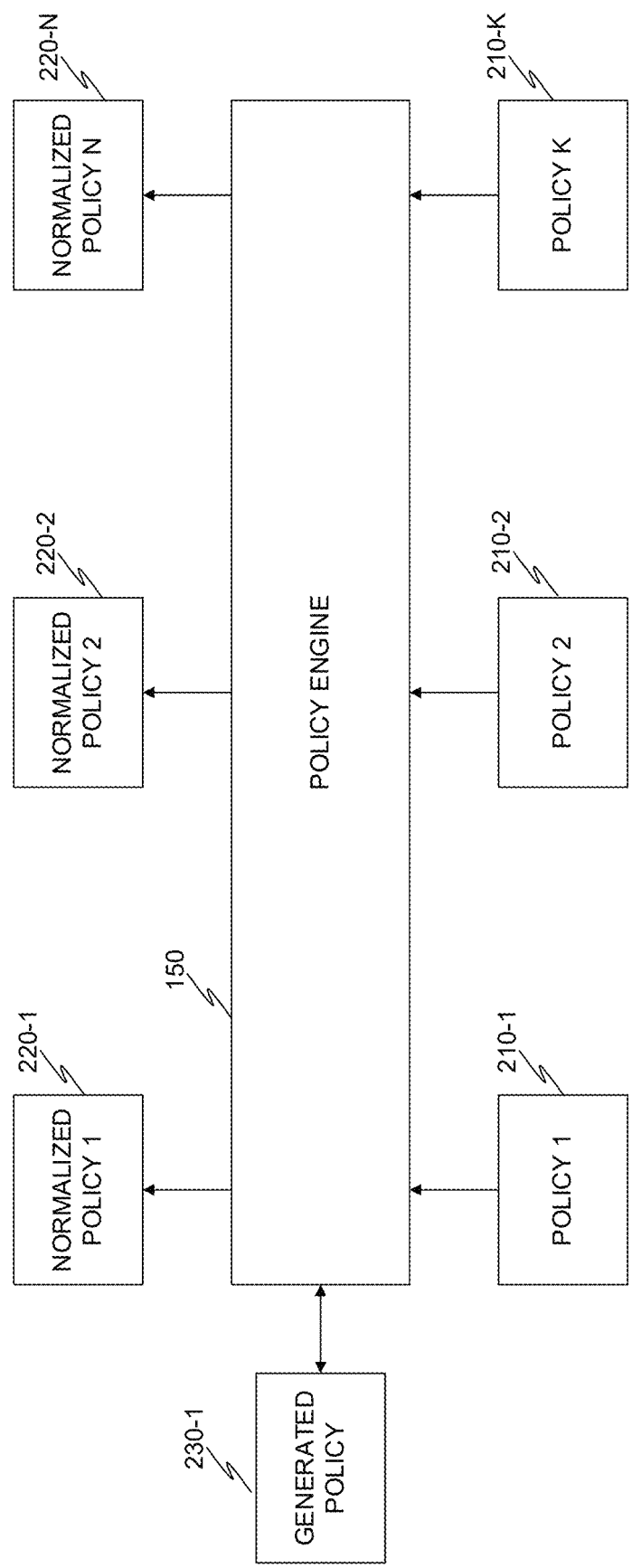
FIG. 2 is an example diagram of a policy engine for generating policies of a digital security platform, implemented in accordance with an embodiment.

FIG. 2 is an example diagram of a policy engine for generating policies of a digital security platform, implemented in accordance with an embodiment. According to some embodiments, the policy engine 150 is configured to generate a plurality of policies each in a different policy language, based on a single normalized policy.

In some embodiments, a policy engine 150 is configured to receive a plurality of policies 210-1 through 210-K, where 'K' is an integer having a value of '2' or greater. In an embodiment, the plurality of policies 210-1 through 210-K are referred to individually as policy 210, and collectively as policies 210.

In an embodiment, a portion of the policies 210 are stored in a first policy language, and a second portion of the policies 210 are stored in a second policy language. In an embodiment, the policy engine 150 is configured to generate normalized policies 220-1 through 220-N, where 'N' is an integer having a value of '2' or greater. In an embodiment, the plurality of normalized policies 220-1 through 220-N are referred to individually as normalized policy 220, and collectively as normalized policies 220.

In some embodiments, the policy engine 150 is configured to generate a generated policy 230-1 based on a received policy. For example, according to an embodiment, the policy engine is configured to receive a first policy 210-1 in a first policy language and generate a normalized policy 220-1 based on the received first policy 210-1.

In certain embodiments, the policy engine 150 is further configured to generate a generated policy 230-1 based on the normalized policy 220-1. In an embodiment, the generated policy 230-1 is generated based on a policy language which is different than the policy 210-1 based on which the normalized policy 220-1 is generated.

For example, according to an embodiment, the policy 210-1 is stored in a different policy language than the generated policy 220-1. In some embodiments, a plurality of generated policies 230 are generated, each generated in a different policy language. In some embodiments, a policy includes a title, a description, a rule, a condition, and the like.

In an embodiment, the policy engine 150 includes a generative AI which is configured to generate the generated policy 230-1 based on a title, a description, a combination thereof, and the like, which are utilized to modify a predefined prompt to generate the generated policy 230-1.

In certain embodiments, the policy engine 150 is configured to receive a context, for example based on the computing environment 140 of FIG. 1. In some embodiments, the policy engine 150 is configured to generate an iterative policy. In an embodiment, an iterative policy is generated iteratively, with each iteration of the policy being narrower (i.e., applicable to less events), broader (capturing more events), etc. In certain embodiments, the context includes a constraint of a policy language in which the generated policy 230-1 is generated.

For example, according to an embodiment, the policy engine 150 is configured to generate a description of a received policy, wherein the received policy is received in a first policy language. In an embodiment, the policy engine 150 is configured to generate a normalized policy 220-1 based on a received policy 210-1, wherein the received policy is in a first policy language.

In some embodiments, the policy engine 150 is configured to generate a context based on the received policy 210-1. In an embodiment, the context includes a policy title, a policy description, an event triggered by the received policy 210-1, a combination thereof, and the like. In certain embodiments, the event is an event record, for example generated in a computing environment 140.

In some embodiments, the policy engine 150 includes a generative artificial intelligence, such as a large language model (LLM). In an embodiment, the LLM is configured to generate a policy based on a normalized policy, a received policy, a constraint, a combination thereof, and the like.

According to an embodiment, the constraint includes a character length, an operator, an operation, a transition, a combination thereof, and the like. In certain embodiments, a policy generated for a policy language which includes a constraint which is not present in a policy language of a received policy (i.e., the received policy being the original policy from which a normalized is generated, and the generated policy is eventually generated) is tested, for example by the policy engine 150.

In certain embodiments, the policy engine 150 is configured to test a generated policy, for example by applying the generated policy to events which triggered the original policy. In an embodiment, a generated policy is applied in response to determining that the generated policy is triggered by a predetermined number of events which triggered the original policy.

For example, in some embodiments, the generated policy is applied only in response to determining that all events which triggered the original policy also trigger the generated policy. In certain embodiments, a percentage threshold is predefined, for example at 90%, such that the generated policy is applied only in response to determining that the generated policy is triggered by at least 90% of events which triggered the original policy.

In an embodiment, the policy engine 150 is configured to generate a first generated policy. In some embodiments, the policy engine 150 is configured to generate a second generated policy based on the first generated policy, such that the second generated policy is narrower than the first generated policy.

In some embodiments, a narrow policy is a policy which is triggered by a smaller number of events than a broader policy, which is triggered by a larger number of events than the narrow policy.

In an embodiment, the policy engine 150 is configured to generate policies in an iterative manner as disclosed herein, such that each policy is narrower than the preceding policy which was used to generate the current policy.

Figure 3:
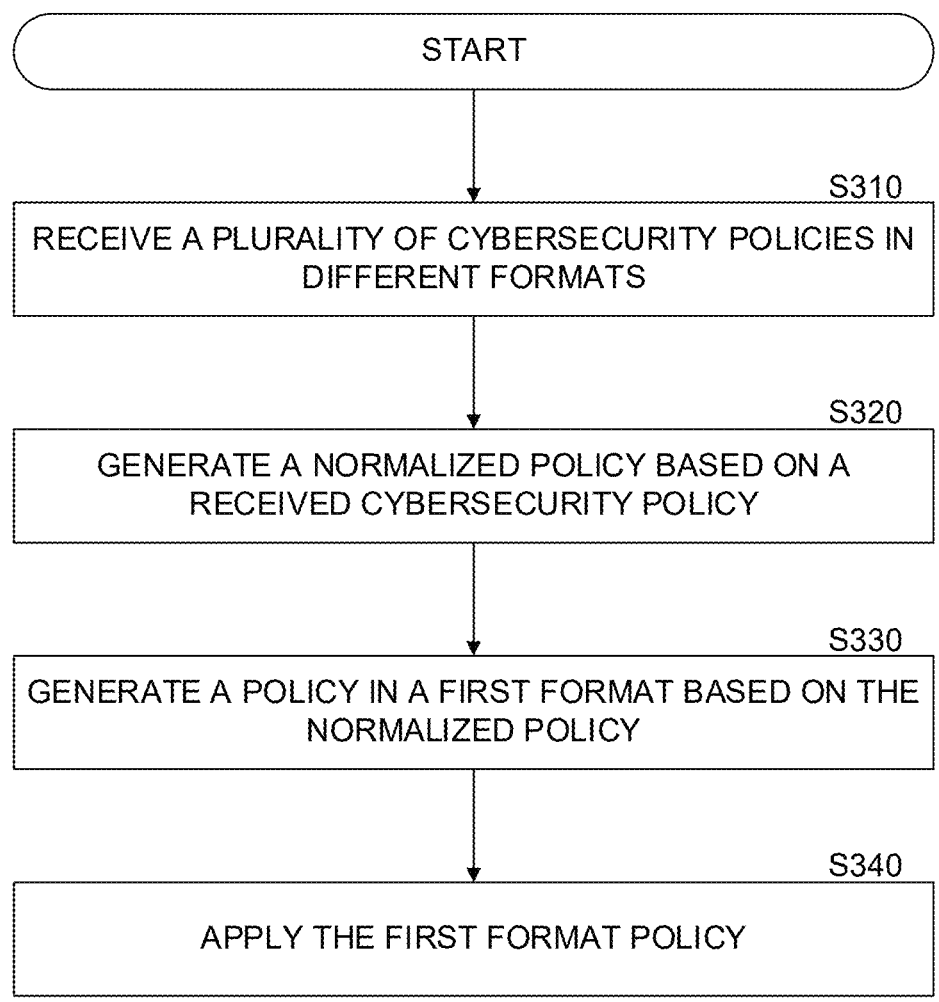
FIG. 3 is an example flowchart of a method for generating a policy for a plurality of cybersecurity platforms, implemented in accordance with an embodiment.

FIG. 3 is an example flowchart of a method for generating a policy for a plurality of cybersecurity platforms, implemented in accordance with an embodiment. In an embodiment, the policies are generated by a policy engine, for example as discussed in more detail herein. In certain embodiments, the policy engine includes a generative artificial intelligence which is configured to generate policies.

At S310, a plurality of cybersecurity policies are received. In an embodiment, each policy is stored in a policy language, policy format, and the like. In some embodiments, a first cybersecurity policy is stored in a first policy language, and a second cybersecurity policy is stored in a second policy language.

In an embodiment, the plurality of cybersecurity policies are imported by the policy engine from a data loss prevention (DLP) platform, a plurality of DLP platforms, etc. In some embodiments, each DLP platform is configured to store policies in a unique policy language, a unique format, a combination thereof, and the like.

At S320, a normalized policy is generated. In an embodiment, the normalized policy is generated based on a received policy. In some embodiments, the normalized policy is generated utilizing a generative artificial intelligence.

In an embodiment, a generative artificial intelligence, such as a large language model, is configured to receive a title of a policy, a description of a policy, a policy, a condition of a policy, a rule of a policy, a plurality of rules of a policy, a combination thereof, and the like.

In some embodiments, the LLM is configured to generate a first policy based on a title, a second policy based on a description, a third policy based on a rule, etc. In certain embodiments, a policy is tested, for example by applying the policy to events which are triggered by a received policy (i.e., a generated policy is applied to events which are triggered by a received policy which was utilized in generating the generated policy).

At S330, a policy is generated. In an embodiment, the policy is generated based on the received policy. In some embodiments, the policy is generated based on a selected policy language, a selected policy format, a combination thereof, and the like.

In an embodiment, generating a policy includes configuring a generative AI to receive the policy, a context, and the like, and generate therefrom a policy in a language, format, etc., which is applied by a DLP platform, for example.

In some embodiments, the generative AI is an LLM which is configured to generate a policy based on a context, a prompt, a combination thereof, and the like. In an embodiment, the LLM is configured to generate the policy based on a context of a computing environment, a policy title, a policy description, a policy rule, a policy condition, a combination thereof, and the like.

In an embodiment, an LLM is configured to modify a prompt based on the context, the policy title, the policy description, the policy rule, the policy condition, a combination thereof, and the like, and generate a policy based on processing the prompt.

In some embodiments, the LLM is configured to generate the policy utilizing a selected format, a selected policy language, a combination thereof, and the like. In certain embodiments, the LLM is configured to generate a plurality of policies utilizing a plurality of selected formats, a plurality of selected policy languages, a combination thereof, and the like.

At S340, the generated policy is applied. In an embodiment, the generated policy is applied by a DLP platform, a DSP platform, an IAM system, a firewall, various combinations thereof, and the like.

In an embodiment, applying a generated policy includes applying a generated policy on an event which is detected based on the received policy. In certain embodiments, this includes testing the generated policy. For example, in an embodiment, the generated policy should be triggered by each event which triggered the received policy.

In some embodiments, a mitigation action is initiated in response to triggering a policy. For example, in an embodiment, a mitigation action includes generating an alert, generating a ticket in an issue tracking system, and the like.

Figure 4:
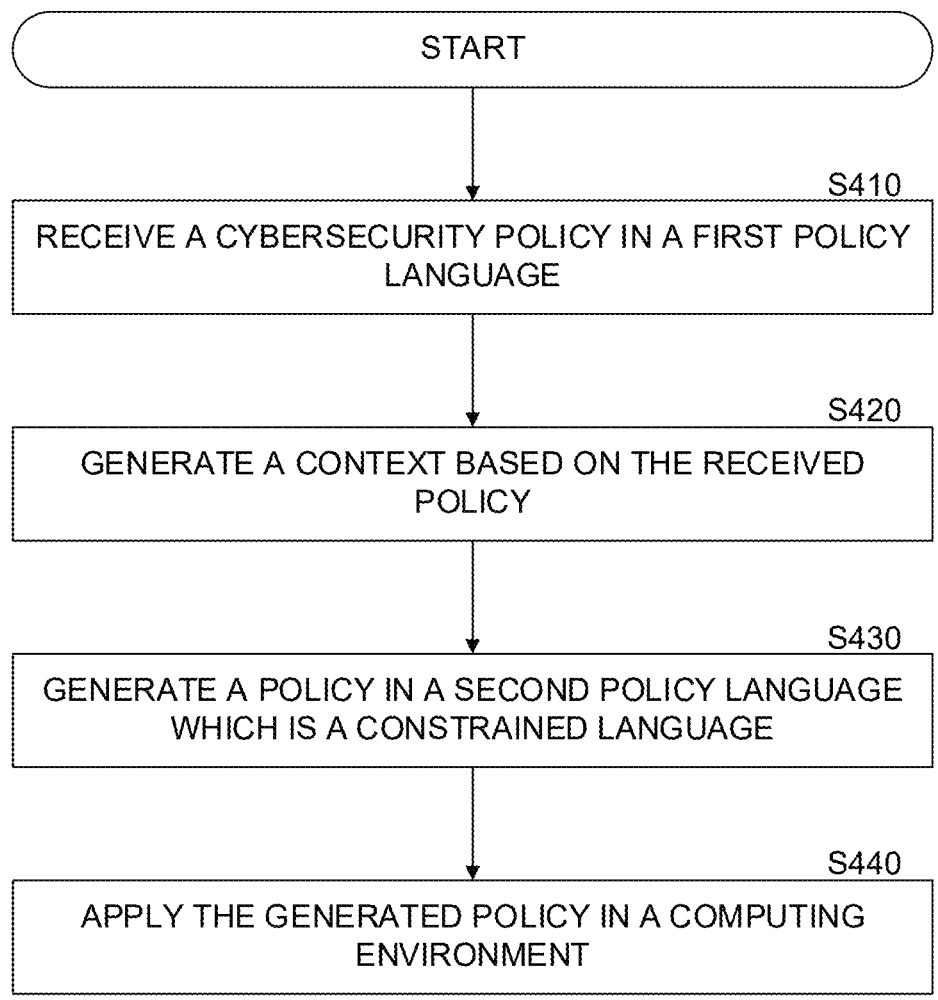
FIG. 4 is an example flowchart of a method for dynamically generating compact policies, implemented in accordance with an embodiment.

FIG. 4 is an example flowchart of a method for dynamically generating compact policies, implemented in accordance with an embodiment. In an embodiment, a compact policy is a policy which is constrained, for example, by a character length, by an availability of operators, and the like.

At S410, a cybersecurity policy is received. In an embodiment, the cybersecurity policy is received in a first policy language. In some embodiments, the cybersecurity policy is imported from a DLP platform, a DSP platform, a firewall, a combination thereof, and the like.

In an embodiment, a plurality of cybersecurity policies are received, each from a different platform, system, and the like, which each utilize a unique policy language. In some embodiments, each unique policy language of the received cybersecurity policies is a less restrictive policy language than a generated policy as described below.

At S420, a policy context is generated. In an embodiment, the context is generated based on the received cybersecurity policy. In some embodiments, the context is generated by a generative artificial intelligence. In an embodiment, the generative AI is configured to generate a context for language model, such as an LLM, based on the received policy, a normalized policy, a constraint, a combination thereof, and the like.

In an embodiment, the normalized policy is generated based on the received policy. In an embodiment, the context is generated by processing a predetermined prompt which is modified based on the constraint, the received policy, and the like. In certain embodiments, the constraint is a character length of the policy, an availability of operators (i.e., not all policy languages support all operators), a combination thereof, and the like.

At S430, a second policy is generated. In an embodiment, the second policy is generated based on the generated context and based on the received policy. In some embodiments, the second policy is generated based on any one of: the generated context, the received policy, the normalized policy generated based on the received policy, a constraint, a combination thereof, and the like.

In an embodiment, the second policy is generated by a generative AI, including an LLM, which is configured to process a prompt. In an embodiment, the prompt is generated by modifying a predetermined prompt based on the received policy, a context of the policy, a constraint, a plurality of constraints, a combination thereof, and the like.

In an embodiment, the prompt, when processed by the LLM, outputs a second policy in a second policy language, which is different from the policy language of the received policy. In certain embodiments, a plurality of second policies are generated, each in a different second policy language.

According to some embodiments, the second policy language is a more restrictive policy language than the first policy language. For example, in an embodiment, a second policy language is more restrictive than a first policy language where the second policy language includes a constraint which is not present in the first policy language, where the second policy language includes more constraints than the first policy language, a combination thereof, and the like.

At S440, the generated policy is applied. In an embodiment, the generated policy is applied by a DLP platform, a DSP platform, an IAM system, a firewall, various combinations thereof, and the like.

In an embodiment, applying a generated policy includes applying a generated policy on an event which is detected based on the received policy. In certain embodiments, this includes testing the generated policy. For example, in an embodiment, the generated policy should be triggered by each event which triggered the received policy.

In some embodiments, a mitigation action is initiated in response to triggering a policy. For example, in an embodiment, a mitigation action includes generating an alert, generating a ticket in an issue tracking system, and the like.

Figure 5:
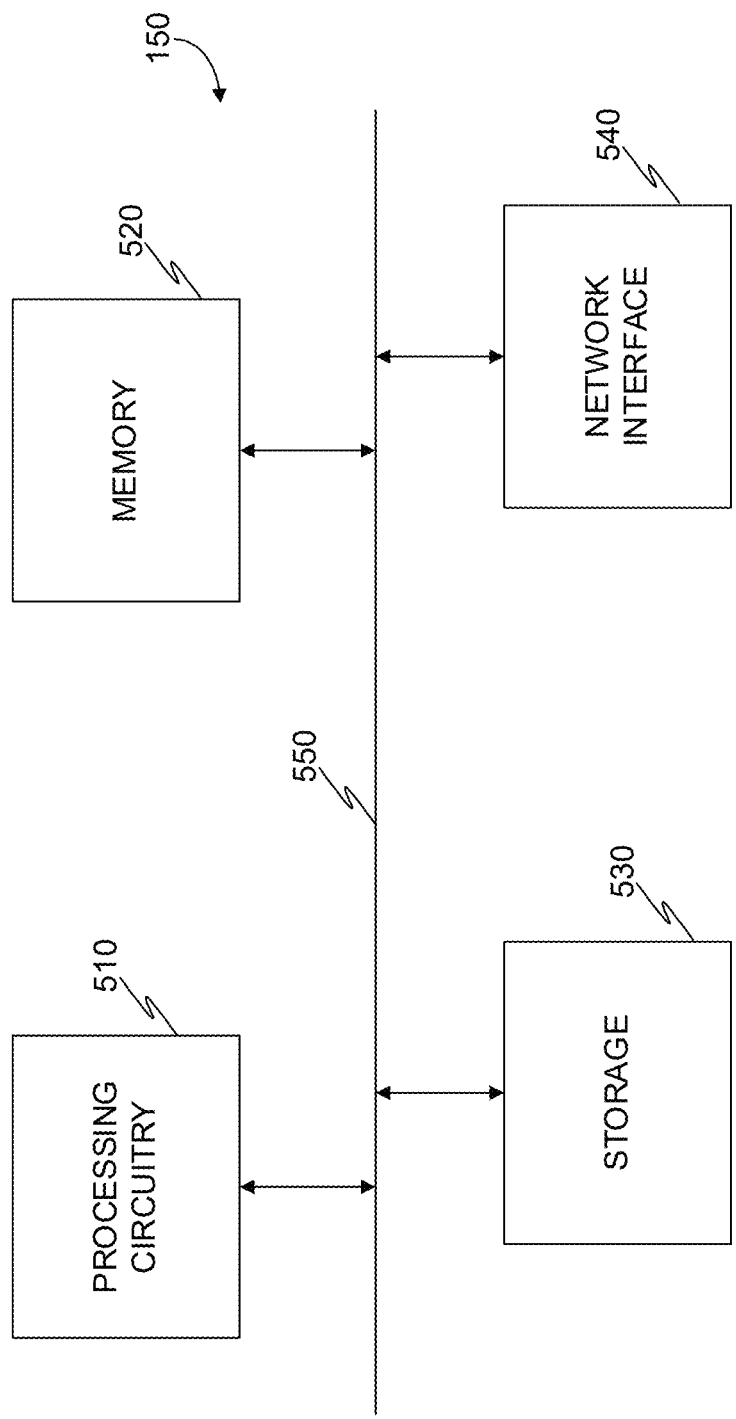
FIG. 5 is an example schematic diagram of a policy engine according to an embodiment.

FIG. 5 is an example schematic diagram of a policy engine 150 according to an embodiment. The policy engine 150 includes, according to an embodiment, a processing circuitry 510 coupled to a memory 520, a storage 530, and a network interface 540. In an embodiment, the components of the policy engine 150 are communicatively connected via a bus 550.

In certain embodiments, the processing circuitry 510 is realized as one or more hardware logic components and circuits. For example, according to an embodiment, illustrative types of hardware logic components include field programmable gate arrays (FPGAs), application-specific integrated circuits (ASICs), Application-specific standard products (ASSPs), system-on-a-chip systems (SOCs), graphics processing units (GPUs), tensor processing units (TPUs), Artificial Intelligence (AI) accelerators, general-purpose microprocessors, microcontrollers, digital signal processors (DSPs), and the like, or any other hardware logic components that are configured to perform calculations or other manipulations of information.

In an embodiment, the memory 520 is a volatile memory (e.g., random access memory, etc.), a non-volatile memory (e.g., read only memory, flash memory, etc.), a combination thereof, and the like. In some embodiments, the memory 520 is an on-chip memory, an off-chip memory, a combination thereof, and the like. In certain embodiments, the memory 520 is a scratch-pad memory for the processing circuitry 510.

In one configuration, software for implementing one or more embodiments disclosed herein is stored in the storage 530, in the memory 520, in a combination thereof, and the like. Software shall be construed broadly to mean any type of instructions, whether referred to as software, firmware, middleware, microcode, hardware description language, or otherwise. Instructions include, according to an embodiment, code (e.g., in source code format, binary code format, executable code format, or any other suitable format of code). The instructions, when executed by the processing circuitry 510, cause the processing circuitry 510 to perform the various processes described herein, in accordance with an embodiment.

In some embodiments, the storage 530 is a magnetic storage, an optical storage, a solid-state storage, a combination thereof, and the like, and is realized, according to an embodiment, as a flash memory, as a hard-disk drive, another memory technology, various combinations thereof, or any other medium which can be used to store the desired information.

The network interface 540 is configured to provide the policy engine 150 with communication with, for example, the computing environment 140, the IAM system 110, firewall 122, a combination thereof, and the like, according to an embodiment.

It should be understood that the embodiments described herein are not limited to the specific architecture illustrated in FIG. 5, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more processing units ("PUs"), a memory, and input/output interfaces. The computer platform may also include an operating system and microinstruction code. The various processes and functions described herein may be either part of the microinstruction code or part of the application program, or any combination thereof, which may be executed by a PU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for dynamically generating a compact cybersecurity policy based on an original policy, comprising:
   receiving a first cybersecurity policy in a first policy language, wherein the first policy language including is in a first data format;
   determining a constraint of a second policy language, wherein the second policy language is in a second data format, wherein each of the first data format and the second data format is a unique format;
   generating a context for a generative artificial intelligence (AI) based at least on the determined constraint of the second policy language;
   configuring the generative AI to dynamically generate a second cybersecurity policy in the second policy language based on the determined constraint and the generated context, wherein the generative AI is configured to dynamically generate the second cybersecurity policy in the second cybersecurity language from the first cybersecurity policy in the first cybersecurity language; and
   applying the dynamically generated second cybersecurity policy in a cybersecurity platform configured to utilize the second policy language.

2. The method of claim 1, further comprising:
   detecting a length constraint of the second policy language, wherein the length constraint is a constraint on the length of a policy stored as a string of characters, wherein the determined constraint of the second policy language is the detected length constraint.

3. The method of claim 1, wherein the constraint of the second policy language is a second constraint, further comprising:
   detecting, in the first cybersecurity policy, a first constraint, wherein the second policy language does not support the first constraint; and
   determining the second constraint of the second policy language based on the first constraint.

4. The method of claim 1, further comprising:
   configuring the generative AI to detect a policy intent in the first policy language; and
   configuring the generative AI to further generate the second cybersecurity policy based on the detected policy intent.

5. The method of claim 1, further comprising:
   generating a prompt for a language model, wherein the generative AI includes the language model; and
   generating the second cybersecurity policy based on a result of processing the generated prompt by the generative AI utilizing at least the language model.

6. The method of claim 5, further comprising:
   generating the prompt based on: the generated context, the determined constraint, and the received first cybersecurity policy.

7. The method of claim 6, wherein the second policy language is among a plurality of second policy languages, further comprising:
   generating the prompt based on a first prompt template selected from a plurality of prompt templates, wherein each prompt template corresponds to a unique second policy language of the plurality of second policy languages.

8. A non-transitory computer-readable medium storing a set of instructions for dynamically generating a compact cybersecurity policy based on an original policy, the set of instructions comprising:
   one or more instructions that, when executed by one or more processing circuitries of a device, cause the device to:
      receive a first cybersecurity policy in a first policy language, wherein the first policy language including is in a first data format;
      determine a constraint of a second policy language, wherein the second policy language is in a second data format, wherein each of the first data format and the second data format is a unique format;

generate a context for a generative artificial intelligence (AI) based at least on the determined constraint of the second policy language;

configure the generative AI to dynamically generate a second cybersecurity policy in the second policy language based on the determined constraint and the generated context, wherein the generative AI is configured to dynamically generate the second cybersecurity policy in the second cybersecurity policy language from the first cybersecurity policy in the first cybersecurity language; and apply the dynamically generated second cybersecurity policy in a cybersecurity platform configured to utilize the second policy language.

9. A system for dynamically generating a compact cybersecurity policy based on an original policy comprising:

one or more processing circuitries configured to:

receive a first cybersecurity policy in a first policy language, wherein the first policy language including is in a first data format;

determine a constraint of a second policy language, wherein the second policy language is in a second data format, wherein each of the first data format and the second data format is a unique format;

generate a context for a generative artificial intelligence (AI) based at least on the determined constraint of the second policy language:

configure the generative AI to dynamically generate a second cybersecurity policy in the second policy language based on the determined constraint and the generated context, wherein the generative AI is configured to dynamically generate the second cybersecurity policy in the second cybersecurity policy language from the first cybersecurity policy in the first cybersecurity language; and apply the dynamically generated second cybersecurity policy in a cybersecurity platform configured to utilize the second policy language.

10. The system of claim 9, wherein the one or more processing circuitries are further configured to:

detect a length constraint of the second policy language, wherein the length constraint is a constraint on the length of a policy stored as a string of characters, wherein the determined constraint of the second policy language is the detected length constraint.

11. The system of claim 9, wherein the constraint of the second policy language is a second constraint, wherein the one or more processing circuitries are further configured to:

detect, in the first cybersecurity policy, a first constraint, wherein the second policy language does not support the first constraint; and determine the second constraint of the second policy language based on the first constraint.

12. The system of claim 9, wherein the one or more processing circuitries are further configured to:

configure the generative AI to detect a policy intent in the first policy language; and configure the generative AI to further generate the second cybersecurity policy based on the detected policy intent.

13. The system of claim 9, wherein the one or more processing circuitries are further configured to:

generate a prompt for a language model, wherein the generative AI includes the language model; and generate the second cybersecurity policy based on a result of processing the generated prompt by the generative AI utilizing at least the language model.

14. The system of claim 13, wherein the one or more processing circuitries are further configured to:

generate the prompt based on:

the generated context, the determined constraint, and the received first cybersecurity policy.

15. The system of claim 14, wherein the second policy language is among a plurality of second policy languages, wherein the one or more processing circuitries are further configured to:

generate the prompt based on a first prompt template selected from a plurality of prompt templates, wherein each prompt template corresponds to a unique second policy language of the plurality of second policy languages.

* * * * *